Patented May 28, 1929.

1,715,242

UNITED STATES PATENT OFFICE.

BERTRAM MAYER AND HUGO SIEBENBÜRGER, OF BASEL, SWITZERLAND, ASSIGNORS TO SOCIETY OF CHEMICAL INDUSTRY IN BASLE, OF BASEL, SWITZERLAND.

DYESTUFF PREPARATIONS AND PROCESS OF MAKING SAME.

No Drawing. Application filed July 2, 1928, Serial No. 290,022, and in Switzerland July 12, 1927.

This invention relates to the manufacture of new dyestuff preparations, particularly suitable for the production of fast tints on the fibre. It comprises the process of making these new preparations, and the new preparations themselves.

The vat dyestuff known as iso-violanthrone (Schultz, Farbstofftabellen, 5th edition, No. 766) dyes cotton in unsightly brownish violet tints, whereas the so-called dichloro-iso-violanthrone (Schultz No. 767) dyes cotton vivid red violet tints.

This invention is based on the observation that when these compounds are mixed together, whether by mechanically mixing them or by oxidation of a mixture of the corresponding leuco-compounds in substance or on the fibre, new products are obtained which dye the fibre violet tints, the productiveness of which and, above all, their vividness exceeds what would be expected from the dyeings of the individual components. At the same time the dyeings obtained show a strong and quite surprising shifting of the tint towards blue.

Obviously, it is possible to convert the new products into leuco-preparations or leuco-ester salts and to use them in this form.

The following examples illustrate the invention:—

Example 1.

50 parts by weight of iso-violanthrone are mixed in a suitable apparatus with 50 parts of dichloro-iso-violanthrone. The product dyes cotton in the vat violet tints which in purity are not second to those which are obtained from the pure dichloro-iso-violanthrone and are essentially more bluish. Instead of mechanically mixing the two constituent dyestuffs, the mixture may be obtained in any other manner, for instance by oxidizing a mixture of the corresponding leuco-compounds.

Similar products are obtained when the proportion in which the 2 dyestuffs are mixed is varied in either direction.

Example 2.

Cotton is dyed in the usual manner for the dyestuffs of the violanthrone or iso-violanthrone series with a mixture from 65 parts of iso-violanthrone and 35 parts of dichloro-iso-violanthrone. There is thus obtained a violet that is quite considerably bluer, purer and more powerful than the tint that would be expected from the appearance of a dyeing from 100 parts of iso-violanthrone and one from 100 parts of dichloro-iso-violanthrone.

What we claim is:—

1. As new products dyestuff preparations consisting in a mixture of iso-violanthrone and dichloro-iso-violanthrone.

2. In the preparation of dyestuff preparations the process consisting in mixing iso-violanthrone with dichloro-iso-violanthrone.

3. In the preparation of dyestuff preparations the process consisting in mixing iso-violanthrone with dichloro-iso-violanthrone by oxidizing together a mixture of the leuco-compounds of said dyestuffs.

4. In the preparation of dyestuff preparations the process consisting in mixing iso-violanthrone with dichloro-iso-violanthrone by oxidizing together a mixture of the leuco-compounds of said dyestuff on textile material.

In witness whereof we have hereunto signed our names this 19th day of June, 1928.

BERTRAM MAYER.
HUGO SIEBENBÜRGER.